W. G. HOUSKEEPER.
COMBINED METAL AND GLASS STRUCTURE AND METHOD OF MAKING SAME.
APPLICATION FILED JAN. 4, 1918.

1,294,466.

Patented Feb. 18, 1919.

Inventor:
William G. Houskeeper
by J. G. Roberts
Att'y

UNITED STATES PATENT OFFICE.

WILLIAM G. HOUSKEEPER, OF PHILADELPHIA, PENNSYLVANIA, ASSIGNOR TO WESTERN ELECTRIC COMPANY, INCORPORATED, OF NEW YORK, N. Y., A CORPORATION OF NEW YORK.

COMBINED METAL AND GLASS STRUCTURE AND METHOD OF MAKING SAME.

1,294,466.           Specification of Letters Patent.    Patented Feb. 18, 1919.

Application filed January 4, 1918. Serial No. 210,397.

*To all whom it may concern:*

Be it known that I, WILLIAM G. HOUSKEEPER, a citizen of the United States, residing at Philadelphia, in the county of Philadelphia, State of Pennsylvania, have invented certain new and useful Improvements in Combined Metal and Glass Structures and Methods of Making Same, of which the following is a full, clear, concise, and exact description.

This invention relates to structures, particularly containers or tubes which in use are exhausted to considerably below atmospheric pressure, consisting of glass and metal elements hermetically sealed together and to a method for effecting the union between the glass and metal elements.

The manufacture of vacuum tube lightning arresters, in which part of the container or shell is of glass and part of metal or of glass of a different coefficient of expansion, and the setting up of air pump tubing embodying similar diverse elements, as well as the construction of other devices for use in connection with vacuum work, are rendered difficult because of the fact that one of the elements contracts more rapidly than the other when an attempt is made to weld them together; as a result the adjacent surfaces of the elements are not perfectly united throughout, but are either separated at one or more places, which permits the leakage of air to the interior of the finished structure, or else are so insecurely united that separation takes place under slight shock or inequality of pressure.

This invention has for its object the elimination of this defect and is based on the discovery that if the end of a metal tube is sufficiently thin, it may be readily welded to a glass tube and will then form therewith a permanent hermetic seal.

Figure 1:
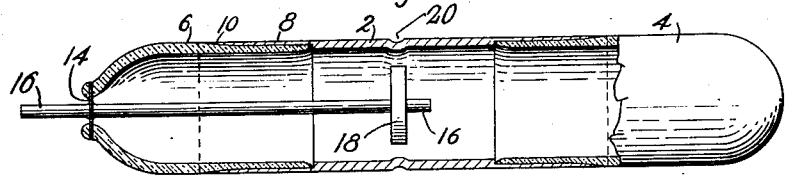
Figure 2:
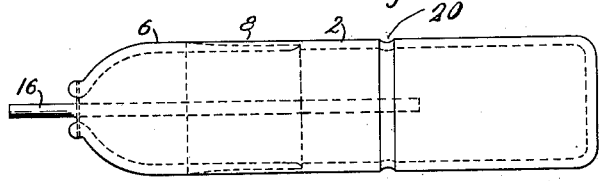
Figure 3:
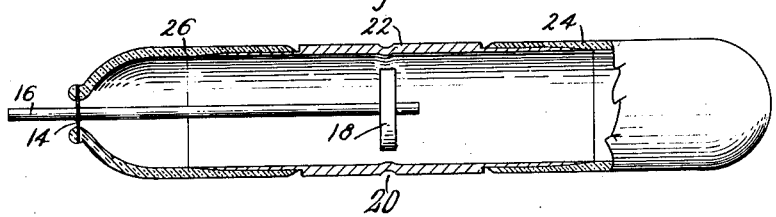
Figure 4:
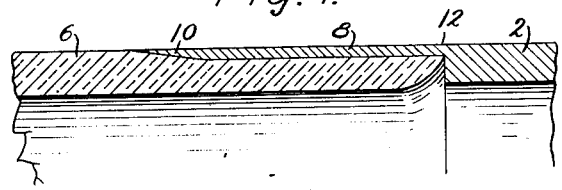
Figure 5:
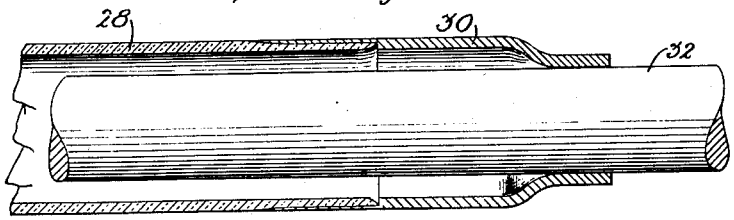

In the accompanying drawings, Figure 1 shows, partly in section. a shell for a lightning arrester embodying my invention; Figs. 2 and 3 show modifications of the arrangement shown in Fig. 1; Fig. 4 shows on a large scale the details of the seal between the glass and the metal; and Fig. 5 is a sectional view of this invention, as applied to the connection of a glass tube to a rod or heavy wire conductor.

In the arrangement shown in Fig. 1, a section of copper or other metal tubing 2 has its opposite ends surrounding and sealed to the inner ends of the glass tubes 4 and 6, the glass and metal being united in the following manner: The metal tube 2, which in the type of structure illustrated may be about $\frac{3}{4}''$ in diameter, has each end portion turned or otherwise reduced to a thickness of about .015" or .020" for at least one diameter of the tube from each end as shown at 8 in Figs. 1 and 4. The copper tube is further reduced at each end to form a knife edge 10, the reduction preferably being tapered so that the taper extends from $\frac{3}{16}''$ to $\frac{1}{4}''$ back on the end of the tube. A section of glass tube 6 having been fitted inside the copper tube with its inner end 12 adjacent to the innermost end of the reduced portion 8 of the copper tube, the copper tube is held in a suitable fixture and is heated to a bright yellow heat in a gas flame. Under the influence of the heat conducted through the walls of the copper tube, the adjacent end of the glass tube softens and the glass is then rolled into contact with the inner surface of the end of copper tube by a graphite rod of suitable dimensions.

A second glass tube 4 is similarly welded to the opposite end of the copper tube. If the metal tube is not of more than a certain thickness, that is, .007" for copper, further reduction of its thickness or the provision of a knife-edge is not necessary in order to permit welding it to a tube of glass to form a hermetic seal as above described.

To form a vacuum lightning arrester, the outer end of the glass tube 6 is softened and reduced in diameter and a small copper or other metal disk 14 is welded thereto; the disk 14 carries a conductor 16 at the inner end of which is a disk 18 supported in concentric relation with the inner portion of the copper tube 6, which has an inwardly projecting ridge 20 formed on its inner surface. The disk 18 and the ridge 20 thus form the electrodes of the arrester. The outer end of the tube 4, which may form part of the tubing leading to an air pump, is sealed after the desired degree of vacuum is obtained.

It is apparent that, by leaving the outer end of the tubes 6 and 4 open, the above described arrangement may be used as a means of connecting two elements formed of glass of different coefficients of expansion, the tube 6, for example, being of lead glass and the tube 4 of much harder glass. Such an application of the invention is useful in connection with apparatus for exhausting containers to low pressures, since it is economical to make the glass portions of the pumping apparatus of hard glass of high melting point, while the containers to be exhausted are generally of a much softer glass with a different coefficient of expansion, and therefore incapable of being fused directly to the air pump tubing.

In Fig. 2, the glass tube 4 has been omitted and the corresponding end of the copper tube 2 is closed, thus producing a simpler structure than that shown in Fig. 1.

In the modification shown in Fig. 3, the inner ends of the glass tubes 24 and 26 surround the reduced ends of the copper tube 22. This arrangement is otherwise the same as that shown in Figs. 1 and 4 and the method of manufacture is the same except that the glass tubes are thus directly heated by the gas flame.

In Fig. 5 there is shown a glass tube 28 to one end of which a copper sleeve 30 is welded in the manner described above, the other end of the copper sleeve being reduced in diameter and soldered or otherwise hermetically sealed to a rod or heavy wire conductor 32. This forms an inexpensive and highly efficacious seal between the glass and the conductor 32 and, as will be apparent, it is very useful as a means of leading in to a glass container a conductor of large diameter and formed of metal whose co-efficient of expansion differs appreciably from that of the glass, since the other end of the tube 28 may be readily welded to the open end of the glass container.

Although I have shown and described my invention as applied to specific glass and metal structures, it is to be understood that it is not limited to such uses but may be used wherever circumstances require a firm and permanent union between metal and glass members or between glass members of different co-efficients of expansion. While the metal tube is, for most purposes, preferably of copper, other metals may be similarly employed.

What is claimed is:

1. The method of uniting a glass tube and a metal tube which consists in reducing the thickness of a portion of the metal tube and welding the glass tube to said portion of reduced thickness.

2. The method of uniting a glass and a metal tube which consists in forming the end of the metal tube into a gradually tapered knife edge, and then welding one end portion of the glass tube to a tubular surface of the end portion of the metal tube.

3. The method of uniting a glass and a metal tube which consists in reducing the thickness of the metal tube for a substantial distance from one end thereof, forming said end of the metal tube into a gradually tapered knife edge, and then welding one end portion of the glass tube to a tubular surface of the end portion of the metal tube.

4. The method of uniting a glass and a metal tube which consists in reducing the thickness of the metal tube for a substantial distance from one end thereof, forming said end of the metal tube into a gradually tapered knife edge, and then welding one end portion of the glass tube to the inner surface of said end portion of the metal tube.

5. The method of uniting a glass and a metal tube which consists in reducing the thickness of the metal tube for a substantial distance from one end thereof, forming said end of the metal tube into a gradually tapered knife edge, fitting said end portion of the metal tube over the glass tube, heating the metal tube until the glass tube softens, and rolling the softened glass onto the inner surface of the metal tube.

6. In combination, a metal tube and a glass tube, one of said tubes having a portion fitted into and welded to a portion of the other tube, the welded portion of the metal tube being of less thickness than the main portion of said tube.

7. In combination, a metal tube havng one end portion of less thickness than the main portion of said tube and terminating in a sharpened edge, and a glass tube welded to said end portion.

8. The combination with a tube of hard glass and a tube of soft glass having different co-efficients of expansion, of a metal tube having one end welded to an end of said hard glass tube and its other end to an end of said soft glass tube.

9. The combination with a tube of hard glass and a tube of soft glass having different co-efficients of expansion, of a metal tube having its end reduced in thickness, one of said tubes being welded to an end of said hard glass tube and its other end being welded to an end of said soft glass tube.

In witness whereof I hereunto subscribe my name this 29th day of December, A. D. 1917.

WILLIAM G. HOUSKEEPER.